(12) United States Patent
Aschwanden

(10) Patent No.: US 8,902,520 B2
(45) Date of Patent: Dec. 2, 2014

(54) ELECTROACTIVE OPTICAL DEVICE

(71) Applicant: Manuel Aschwanden, Allenwinden (CH)

(72) Inventor: Manuel Aschwanden, Allenwinden (CH)

(73) Assignee: Optotune AG, Dietikon (CH)

( * ) Notice: Subject to any disclaimer, the term of this patent is extended or adjusted under 35 U.S.C. 154(b) by 0 days.

(21) Appl. No.: 14/014,825

(22) Filed: Aug. 30, 2013

(65) Prior Publication Data

US 2014/0002877 A1 Jan. 2, 2014

Related U.S. Application Data

(63) Continuation of application No. 13/141,847, filed as application No. PCT/CH2009/000404 on Dec. 18, 2009, now Pat. No. 8,553,341.

(30) Foreign Application Priority Data

Jan. 9, 2009 (WO) ................ PCT/CH2009/000009

(51) Int. Cl.
*G02B 7/02* (2006.01)
*G02B 27/48* (2006.01)
*G11B 7/09* (2006.01)
*G02B 26/08* (2006.01)
*G02F 1/29* (2006.01)

(52) U.S. Cl.
CPC .............. *G02B 27/48* (2013.01); *G11B 7/0935* (2013.01); *G02B 7/023* (2013.01); *G02B 26/0808* (2013.01); *G02B 26/0841* (2013.01); *G02B 26/0875* (2013.01); *G02F 1/29* (2013.01)
USPC .......................................... 359/813; 359/822

(58) Field of Classification Search
CPC ............... G02B 7/023; G02B 26/0808; G02B 26/0841; G02B 26/0875; G02B 27/48; G11B 7/0935; G02F 1/29
USPC ................... 359/813, 814, 822, 824
See application file for complete search history.

(56) References Cited

U.S. PATENT DOCUMENTS

2007/0122132 A1 5/2007 Misawa et al.
2008/0204909 A1 8/2008 Shiota et al.

FOREIGN PATENT DOCUMENTS

EP 1995622 11/2008
WO WO-2007/072411 6/2007

OTHER PUBLICATIONS

International Search Report in corresponding PCT/CH2009/000404 mailed Jan. 28, 2010.

*Primary Examiner* — William Choi

(74) *Attorney, Agent, or Firm* — Marshall, Gerstein & Borun LLP

(57) ABSTRACT

An optical device includes a soft polymer film having a first and second surface. A first compliant electrode is connected to the first surface and a second compliant electrode is connected to the second surface. A rigid optical element is connected on the first and/or second surface or integrated into the polymer film.

17 Claims, 4 Drawing Sheets

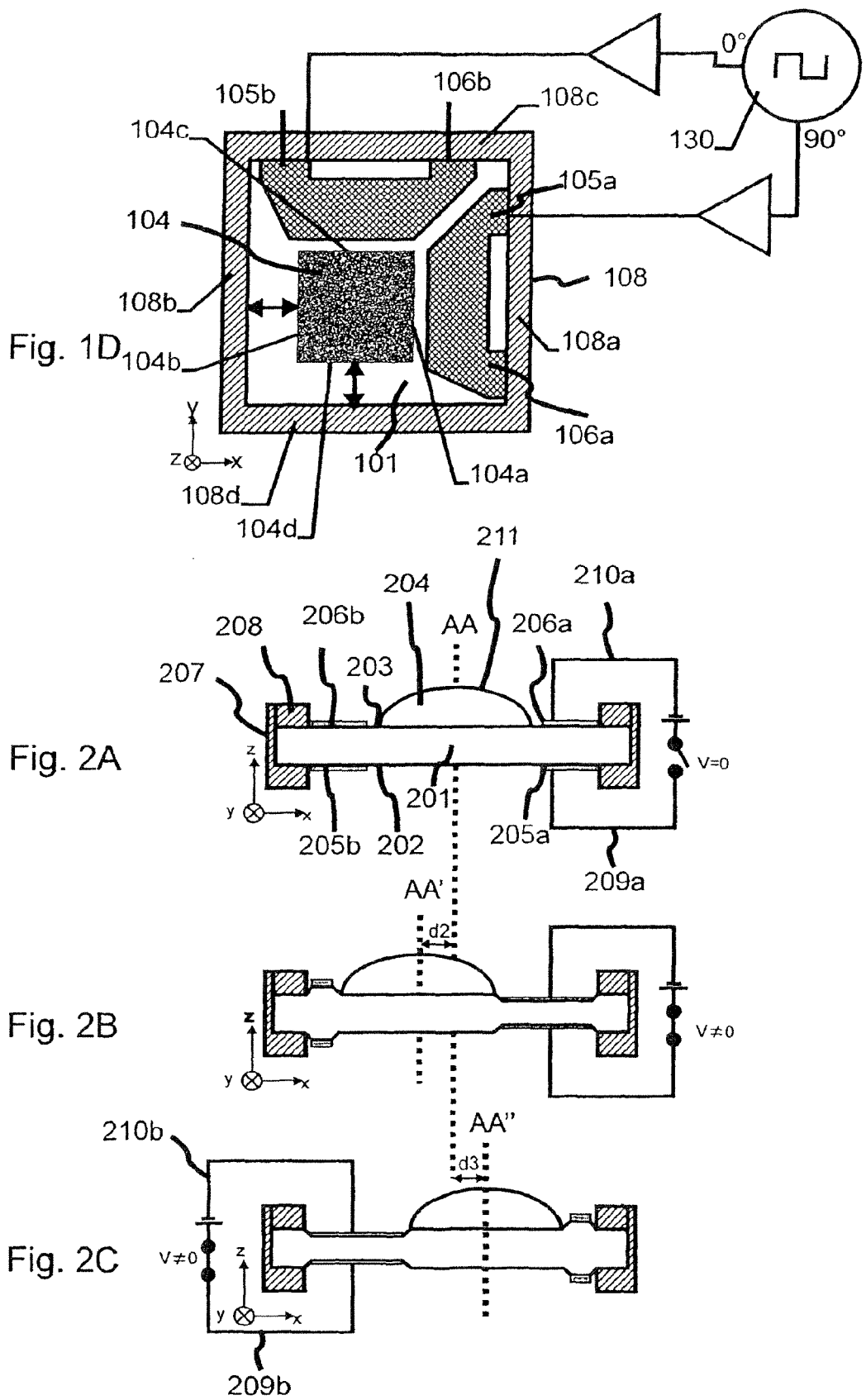

ELECTROACTIVE OPTICAL DEVICE

CROSS-REFERENCE TO RELATED APPLICATIONS

This is a continuation application which claims priority benefit of U.S. application Ser. No. 13/141,847 filed Jun. 23, 2011 which claims priority to PCT/CH2009/000404 filed Dec. 18, 2009 which claims priority to PCT/CH2009/000009 filed Jan. 9, 2009 the disclosure of which is incorporated herein by reference.

FIELD OF THE INVENTION

The invention relates to adjustable optical devices, in particular to an electroactive light scrambler, as well as to methods for operating and manufacturing such a device, and to the use of such a device for light scrambling or lens positioning.

BACKGROUND OF THE INVENTION

An electroactive optical device is an optical device using the electroactive effect.

The term electroactive effect describes an electric-field induced deformation of a solid or liquid. The deformation can be due to Coulomb forces between electrodes and/or due to the rearrangement of electrical ions and/or multipoles, in particular dipoles, in an electric field. Examples of electroactive materials are: dielectric elastomers, electrostrictive relaxor ferroelectric polymers, piezoelectric polymers (PVDF), liquid crystal elastomers (thermal), ionic polymer-metal composites, and mechano-chemical polymers/gels.

A variety of optical light scramblers have been known.

So as to suppress the speckle noise, the exposure illumination apparatus of JP 07-297111-A that uses laser light includes a diffuser plate that can rotate in its optical system such that the diffuser plate may turn coherent light into incoherent light, for example.

Moreover, the projection display apparatus of JP 06-208089, which uses laser light, includes a movable diffuser plate (that can rotate and/or vibrate etc.) in its optical system such that the diffuser plate may turn coherent light into incoherent light.

WO 2006/098281 (US 2008/198334), for example, describes a reflector element that reflects collimated coherent light and is capable of vibrating in parallel with a direction normal to a reflector surface of said reflector element; and a reflector element driver unit that drives the reflector element in vibrating motion. This device consists on a complicated and expensive to manufacture element driver unit and a reflector element that requires a more complex optical design than a transmissive optical light scrambler.

WO 2007/072411 describes an electroactive camera diaphragm where an aperture is contacted or extended by means of an applied electric field. The aperture is formed by the soft, non-transparent electrodes of the device. The same document describes a device where a lens or ring is displaced in a direction transversal to the plane of the polymer film.

OBJECT AND SUMMARY OF THE INVENTION

It is an object of the invention to propose an improved optical device, in particular a light scrambler. This object is achieved by the optical device of claim 1.

To this end, the optical device according to the invention comprises:

a, preferably prestretched, polymer film arranged in a plane and comprising a first surface and a second surface,
a first electrode located on said first surface,
a second electrode located on said second surface, and
a rigid optical element connected to said first and/or second surface or the polymer film.

The application of a voltage to the electrodes displaces the optical element substantially along the plane of the polymer film. In other words, the device is configured such that, when a voltage difference is applied between the first and second electrodes, the axial distance between the electrodes changes, i.e. it increases or decreases due to Coulomb forces (Maxwell stress), causing the polymer film to change dimension in planar direction, i.e. in the direction parallel to the polymer film. This planar deformation is transmitted to the region with the rigid optical element causing a lateral displacement, i.e. a displacement in the direction parallel to the polymer film, of the rigid optical element resulting in a change of the optical characteristics of the device.

Since the optical element is in direct contact with the electro active polymer film, the device is of small size. Furthermore, since the Coulomb forces can cause a large lateral deformation of the polymer film, a displacement of the optical element, e.g. for light scrambling, can be achieved at low frequencies, thereby preventing actuation frequencies in the audible range and guaranteeing noise free operation.

Since the planar elongation of the polymer film depends on the voltage difference applied between the electrodes, the displacement of the optical element can easily be controlled.

In particular, the optical element is an optical diffuser, a refractive, reflective or a diffractive structure.

The optical device can thus be used for light scrambling or for any other light manipulation by changing the lateral position of the rigid optical element.

In an advantageous embodiment, the optical element is made of a plastic, in particular a polymer (e.g. polymethylmethacrylat or polycarbonate), or a glass. Such materials have characteristics that lead to a good compromise between optical quality and the ability to resist the deformation of the polymer. Depending on the intended application, the optical element can e.g. also be made of crystalline material, in particular a single crystal.

Advantageously, the polymer film has a thickness larger than 100 nm and/or smaller than 1 mm. A thickness below 100 nm makes the device difficult to manufacture, while a thickness above 1 mm requires a large voltage to be applied to the electrodes for a given displacement.

In an advantageous embodiment, the polymer film is made of polymers (e.g. PDMS Sylgard 186 by Dow Corning or Optical Gel OG-1001 by Litway) or acrylic dielectric elastomers. Such materials allow a substantial deformation so that the optical element can be displaced by a large distance.

In a very compact embodiment, the first and second electrodes are laterally adjacent to said optical element and/or at a distance d>0 from the surrounding holding frame.

In an alternative embodiment, the first and second electrodes have a lateral distance d>0 to the optical element and the surrounding holding frame. This design has the advantage that it reduces mechanical stress in the polymer film.

The invention also relates to a polymer film sandwiched between two electrodes intended to receive a voltage difference, for the lateral displacement of a rigid optical element in contact with said polymer film.

The electroactive property of such a film and the particular arrangement of the polymer film with respect to the electrodes are advantageously used for the displacement of the rigid optical element under an electrical control.

Advantageously, and as shown in the following embodiments, the plane of the polymer comprises first and second non-overlapping sections, with the electrodes being arranged in the first section and the optical element being arranged in the second section. This allows to obtain a maximum amount of displacement upon application of a voltage to the electrodes. Any substantial overlap between electrodes and optical element reduces the efficiency of the device because the polymer film does not deform in the region of the rigid optical element.

The invention also relates to a method for operating an optical device, which optical device comprises a polymer film having a first surface and a second surface, a first electrode located on said first surface, a second electrode located on said second surface, and a rigid, undeformable optical element connected to said polymer film. The method comprises the step of applying a voltage difference between said first electrode and said second electrode, thereby displacing said rigid optical element substantially along a plane parallel to said polymer film.

An embodiment of an optical device according to the present invention may be obtained by a procedure comprising the following steps:

stretching a polymer film by a certain amount, e.g. 200% in x-direction and 300% in y-direction attaching the polymer film to a holding means, e.g. an encompassing frame;

applying a first electrode on a first surface of the polymer film applying a second electrode on a second surface of the polymer film applying a rigid optical element consisting of a mechanically harder material than the polymer film to at least one of the surfaces of the polymer film adjacent to at least one of said electrodes.

A second embodiment of a manufacturing process comprises the steps of:

placing the rigid optical element onto a supporting surface;

distributing a polymer over the rigid optical element and curing it at least partially to form a polymer film;

removing the assembly obtained by said steps a) and b) from the supporting surface and prestretching the polymer film with the rigid optical element;

attaching the polymer films to a holding means, e.g. an encompassing frame;

applying a first electrode on a first surface of the polymer film; and applying a second electrode on a second surface of the polymer film.

Detailed explanations and other aspects of the invention will be given below.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1D depicts an alternative to the first embodiment, FIG. 2A depicts a second embodiment of an optical device according to the invention in a first state, FIG. 2B depicts the second embodiment in a second state, FIG. 2C depicts the second embodiment in a third state.

DETAILED DESCRIPTION OF EMBODIMENTS

Definitions

The term "axial" is generally used to designate a direction perpendicular to the surface of the polymer film in its relaxed state, which corresponds to a direction parallel to the optical axis AA shown in some of the figures. The term "lateral" is used to designate a direction perpendicular to the axial direction, i.e. a direction parallel to the polymer film.

The term "a rigid, undeformable optical element" designates an element that is substantially more rigid than the polymer film, i.e. by having a Young's modulus exceeding the one of the polymer film by a factor of at least 10, in particular at least 100.

INTRODUCTION

The invention utilizes displacements due to Maxwell stress induced deformation. This phenomenon relates to the deformation of a polymer material sandwiched between two compliant electrodes. When a voltage is applied between said electrodes, the electrostatic forces resulting from the free charges squeezes and stretches the polymer. The present invention can be implemented in a variety of forms, e.g. as electroactive light scrambler or as an electroactive optical element displacement device. In the following, we describe some of these applications.

Electroactive Light Scrambler

Figure 1A:
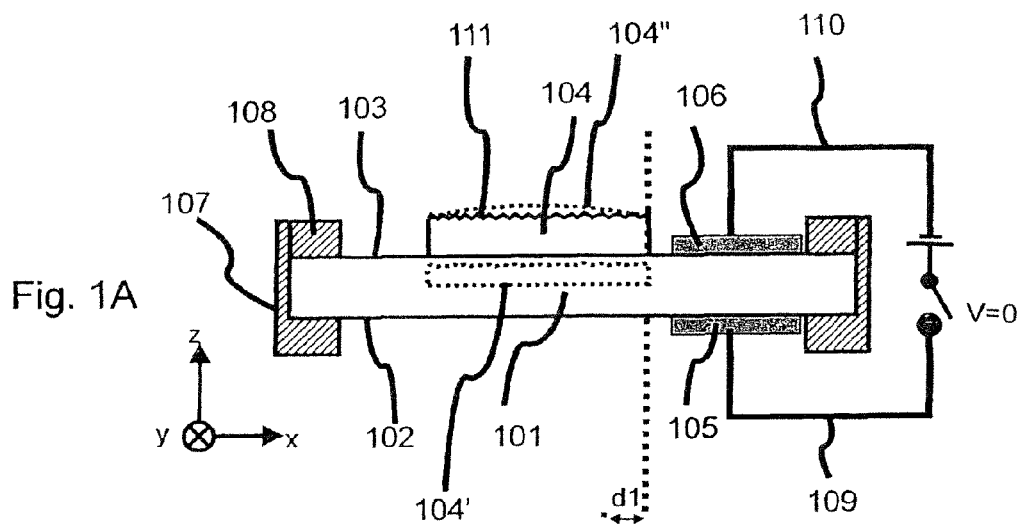
FIG. 1A depicts a first embodiment of an optical device according to the invention, in a first state.
Figure 1B:
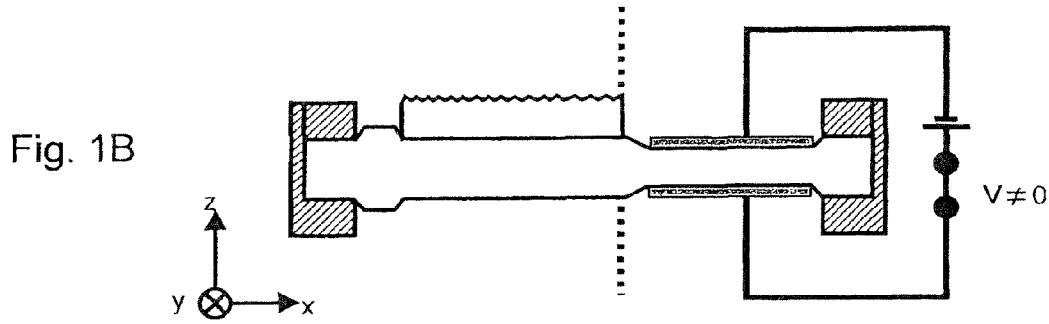
FIG. 1B depicts the first embodiment in a second state.
Figure 1C:
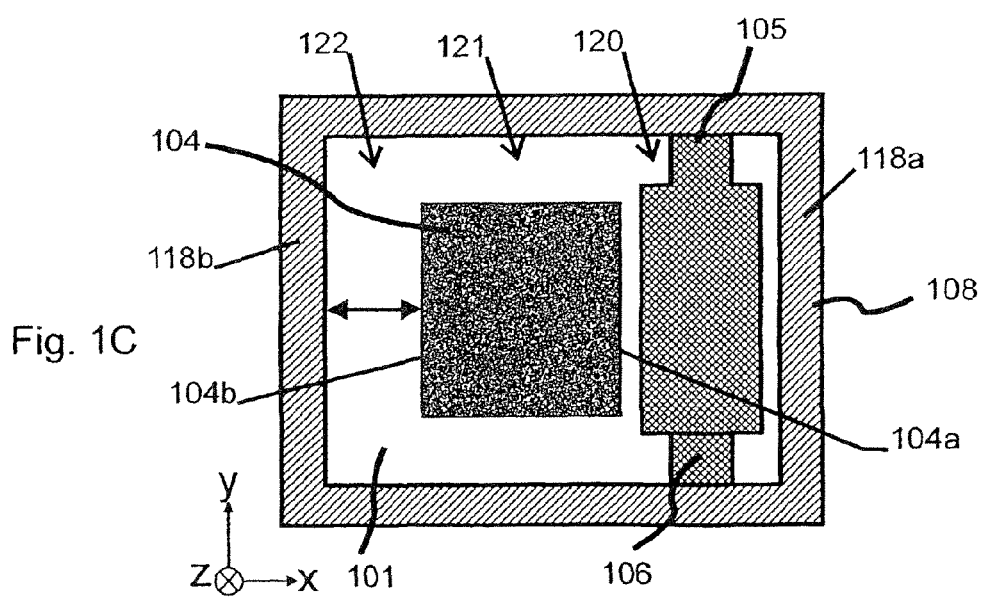
FIG. 1C depicts the first embodiment in a top view.

One possible embodiment of the present invention is an electroactive light scrambler as shown in FIGS. 1A-1C. This embodiment comprises:

A polymer film 101 comprising a first surface 102 and a second surface 103. The polymer film 101 is advantageously made of elastomers such as silicon rubber, acrylic dielectric elastomer, duroplastic elastomers, thermoplastic elastomers or polyurethane. The characteristics of dielectric polymers are such that they are soft (compliant), have a relatively high dielectric constant (approximately 2 or more), and have a high electric breakdown strength (a few tens up to a hundred kV/mm).

A first electrode 105 located on the first surface 102,

A second electrode 106 located on the second surface 103,

A rigid optical element 104 connected to the first or second surface or integrated into the polymer film 101. The optical element corresponds to a diffusive (refractive, reflective, diffractive or absorptive) structure. The optical element may be fixed directly on the first or second surface or by means of an adhesive or a weld or connected to the polymer film by means of adhesive of clamping. The optical structure is rigid and does not deform during operation.

The polymer film 101 is preferably prestretched and connected to a first and second holding frame 107 and 108, respectively, which form a holding means of the polymer film. In the present embodiment, an edge region of polymer film 101 is clamped between the first and the second holding frame 107, 108 and thus held in the holding means.

As known to the skilled person, the term "prestretching" (or pre-straining) can be understood as suspending the polymer film in the holding frame 107, 108 in such a manner that it is under tensional strain, i.e. a tensional force tries to keep the polymer film straight.

The polymer film is freely suspended in the holding means, i.e. it is only supported by the holding means with (apart form optical element 104) no further stationary, rigid elements being in contact with its surfaces.

The first electrode 105 is connected to a first conductor 109 and the second electrode 106 is connected to a second conductor 110. Conductors 109 and 110 are intended to be connected to a voltage difference V.

The electrodes should be compliant, i.e. they should be able to follow the deformations of the polymer film 101 without being damaged. Advantageously, the electrodes are therefore manufactured from one of the following materials:
- Carbon nanotubes (see "Self-clearable carbon nanotube electrodes for improved performance of dielectric elastomer actuators", Proc. SPIE, Vol. 6927, 69270P (2008);)
- Carbon black (see "Low voltage, highly tunable diffraction grating based on dielectric elastomer actuators", Proc. SPIE, Vol. 6524, 65241N (2007);)
- Carbon grease/conducting greases
- Metal ions (Au, Cu, Cr, . . . ) (see "Mechanical properties of electroactive polymer microactuators with ion-implanted electrodes", Proc. SPIE, Vol. 6524, 652410 (2007);)
- Liquid metals (e.g. Galinstan)
- Metallic powders, in particular metallic nanoparticles (Gold, silver, copper)
- Conducting polymers (intrinsically conducting or composites)

The electrodes may be deposited by means of any of the following techniques:
- Spraying
- Ion-implantation (see "Mechanical properties of electroactive polymer microactuators with ion-implanted electrodes", Proc. SPIE, Vol. 6524, 652410 (2007);)
- PVD, CVD
- Evaporation
- Sputtering
- Photolithography
- Printing, in particular contact printing, inkjet printing, laser printing, and screen printing.
- Field-guided self-assembly (see e.g. "Local surface charges direct the deposition of carbon nanotubes and fullerenes into nanoscale patterns", L. Seemann, A. Stemmer, and N. Naujoks, Nano Letters 7, 10, 3007-3012, 2007)
- Brushing
- Electrode plating Optionally, optical element 104 can be structured. Suitable shapes can e.g. be:
- Spherical lenses (convex and concave)
- Fresenel lenses
- Cylindrical lenses
- Aspherical lenses (convex and concave)
- Flat
- Squares, triangles, lines or pyramids
- Any micro (e.g. micro lens array, diffraction grating, hologram) or nano (e.g. antireflection coating) structure 111, 211 can be integrated into the optical element 104 and the compliant electrode containing polymer layer. When an antireflective layer is to be applied to at least one surface of the optical device, it is advantageously formed by fine structures having a size smaller than the wavelength of the transmitted light. Typically, this size should be smaller than 5 μm for infrared applications, smaller than 1 μm for near-infrared applications, and smaller than 200 nm for applications using visible light.

Any of the following methods can e.g. be applied for forming and structuring the optical element 104:
- Casting, in particular injection molding/mold processing
- Nano-imprinting, e.g. by hot embossing nanometer-sized structures
- Etching (e.g. chemical or plasma)
- Sputtering
- Hot embossing
- Soft lithography (i.e. casting a polymer onto a pre-shaped substrate)
- Chemical self-assembly (see e.g. "Surface tension-powered self-assembly of microstructures—the state-of-the-art", R. R. A. Syms, E. M. Yeatman, V. M. Bright, G. M. Whitesides, Journal of Microelectromechanical Systems 12(4), 2003, pp. 387-417)
- Electro-magnetic field guided pattern forming (see e.g. "Electro-magnetic field guided pattern forming", L. Seemann, A. Stemmer, and N. Naujoks, Nano Lett., 7 (10), 3007-3012, 2007. 10.1021/nl0713373.

The material for the optical element 104 can e.g. comprise or consist of:
- PMMA or PC
- Glass
- Plastic
- Polymer
- Crystalline, in particular single crystal material The material for the polymer film 101 can e.g. comprise or consist of:
- Gels (Optical Gel OG-1001 by Liteway),
- Elastomers (TPE, LCE, Silicones e.g. PDMS Sylgard 186, Acrylics, Urethanes)
- Thermoplast (ABS, PA, PC, PMMA, PET, PE, PP, PS, PVC, . . . )
- Duroplast The geometries of the electrodes can be round, square or any other appropriate form.

FIG. 1A shows the device in a state without applied voltage. In a second state depicted in FIG. 1B, a voltage difference V≠0 is applied between the electrodes 105, 106 via the conductors 109, 110. The polymer film 101 in between the electrodes 105, 106 is compressed. Due to the volume-incompressibility of the polymer film, the region of the polymer film which is in between the compliant electrodes expands in lateral direction. As a consequence, the optical element is laterally displaced by the distance d1. Due to the prestreching of the polymer film, the region that is not in between the first and second electrodes 105,106 and not connected to the optical elements shrinks in lateral direction. This prevents the device from out of plane buckling.

The strain of the polymer film (generally of the order of several tens percents) has a quadratic relation to the voltage difference V. The voltage difference V can be of the order of a few kV, depending on the thickness of the polymer film. To reduce the voltage, a multi-layered structure may be advantageously made, which comprises a plurality of compliant electrodes stacked on top of each other and being alternatingly applied to two different potentials, i.e. with the first, third, fifth etc. electrodes connected to a first potential and the second, fourth, sixth electrodes connected to a second potential.

FIG. 1C depicts the first embodiment of FIG. 1A and FIG. 1B in a top view. The polymer film is advantageously attached to a rectangular holding frame 107, 108.

As can be seen, the plane of the polymer film 101 is divided into three sections 120, 121, 122. The electrodes 105, 106 are arranged in the first section 120. The optical element is arranged in the second section 121. First section 120 extends from the edge of optical element 104 to a first side edge 108a of frame 108. Third section 122, which has no electrodes arranged within it, extends from the opposite edge of optical element 104 to a second side edge 108b of frame 108. First side edge 108a and second side edge 108b are arranged opposite to each other. This design, where there are electrodes arranged at a first side 104a (namely the side facing first edge 108a) of optical element 104, but no electrodes arranged at a second side 104b (namely the side facing second edge 108b) of optical element 104, allows the displacement of the optical element 104 efficiently along one dimension.

FIG. 1D depicts, in a top view, an alternative to the first embodiment according to the invention. It differs from FIG. 1A, FIG. 1B, and FIG. 1C in that several, in the present case two, pairs of first and second electrodes are located on the surfaces 102 and 103 on the polymer film 101. The voltage difference applied between the electrodes 105a and 106a control the lateral displacement of the rigid optical element 104 in x-direction. The voltage difference applied between the electrodes 105b and 106b control the lateral displacement of the rigid optical element 104 in y-direction.

As can be seen, in the embodiment of FIG. 1D, frame 108 has four side edges 108a-d. There are electrodes arranged at the first side 104a and a third side 104c of optical element 104 but no electrodes are arranged on the second side 104b and a forth side 104d, with the connecting line between sides 104a and 104b extending transversally, in particular perpendicularly, to the connecting line between sides 104c and 104d. This allows to displace the optical element 104 in efficient manner along the two dimensions of the polymer film plane.

To operate the device of FIG. 1D, an oscillator 130 being able to generate two oscillating signals having a mutual phase shift of e.g. 90° is used.

In general terms, when operating a device where optical element 104 has to be displaced to perform a periodic back and forth motion, such as in a light scrambler, a signal source 130 generating a periodically varying electrical signal should be provided. Advantageously, the frequency of the signal should be a resonance frequency for said motion of optical element 104, thus that a large mechanical oscillation can be achieved with a comparatively small signal. In typical applications with devices having a size of some mm, the frequency of the electrical signal is in the order of 100-10000 Hz, depending on the size of the device, the weight of the optical element and the elastic properties of the polymer film.

This type of resonant oscillation can be used in light scramblers of the type of FIG. 1C, where the optical element is displaced in a single direction only, or of FIG. 1D, where the optical element is displaced in two directions.

However, resonant oscillation can also be used for devices other than light scramblers.

When using the device as a light scrambler, optical element 104 has to be shaped such that it is suited to destroy visible speckling effects when being moved back and forth. For example, optical element 104 can be a slab of transparent material with a lens array at its surface or other optical diffusers. Such scrambling elements are known to the skilled person.

However, it has been found that an optical element with a lens array at its surface generates beam scattering, which is disadvantageous for many applications, such as image projectors using laser beams. A better solution is shown in dotted lines 104" in FIG. 1A, where the surface of the optical element is curved. In substantially the whole area contacted by the laser beam, the optical element should either have a purely convex or a purely concave surface. (It must be noted that the terms convex and concave include also non-spherical surfaces.). The curving may be overlaid by a microstructure 111 as described above (not shown for curve 104"), and it can be convex or concave, but the curvature should be weak, i.e. the focal length of the element should be large to achieve small diffusion angle. It has been found that this type of element, when oscillated periodically, is sufficient to remove any speckling, while it avoids undesired beam scattering effects.

In general, for scrambling a light beam, the light beam is sent through or reflected by optical element 104 while optical element 104 is being oscillated. The length of the optical path for the light beam passing through the optical element 104 (i.e. its extension parallel to the light beam) varies along the direction of displacement of the element 104.

Electroactive Optical Element Displacement Device

The technology described above can not only be applied to electroactive light scramblers, but to a variety of other electroactive optical devices, such as lens positioners. "Lens positioning" designates, in this context, the displacement of a lens in lateral direction, i.e. in a direction perpendicular to the optical axis AA of the lens.

An example of a lens positioner is shown in FIG. 2A-2C. It differs from FIG. 1A, FIG. 1B, and FIG. 1C in that four pairs of first and second electrodes are located on the surfaces 202 and 203 on the polymer film 201 and that the diffusive optical element 104 is replaced by a refractive, diffractive, reflective or absorptive optical element 204, e.g. a lens or a mirror.

FIG. 2A depicts an embodiment of an optical device according to the invention in a first state. This embodiment comprises:

A polymer film 201 having a first surface 202 and a second surface 203. The polymer film 201 is advantageously made of silicon rubber, acrylic dielectric elastomer, polyurethane or other deformable elastomers. The characteristics of dielectric polymers are such that they are soft (compliant), have a relatively high dielectric constant (approximately 2 or more), and have a high electric breakdown strength (a few tens up to a hundred kV/mm).

Two or more first electrodes 205a-b located on the first surface 202,

Two or more second electrodes 206a-b located on the second surface 203,

A rigid optical element 204, e.g. lens, connected to the first or second surface or integrated into the polymer film 201. The optical element corresponds to a refractive or reflective structure. The optical element may be fixed directly to one of the surfaces of the polymer film 201 by means of an adhesive or welding. Alternatively, the optical element may be fixed to the polymer film by means of adhesive or clamping. The rigid optical element 204 does not deform or at least not substantially deform during operation.

For the same reasons as in the first embodiment, the polymer film is advantageously prestretched and clamped at its edge region between a first and a second holding frame 207 and 208, respectively. The first electrodes 205a-b are connected to first conductors 209a-b and the second electrodes 206a-b are connected to second conductors 210a-b. Conductors 209 and 210 are intended to be connected to a voltage difference V.

The materials and production processes of the electroactive optical element displacement device are the same as the materials and production processes of the electroactive light scrambler.

FIG. 3A shows the device in a state without applied voltage difference. In a second state depicted in FIG. 2B, a voltage difference V is applied between the electrodes 205a and 206a via the conductors 209a and 210a, respectively. The polymer film 201 in between the electrodes 205a-206a is compressed. Due to the volume-incompressibility of the polymer film, the region of the polymer film which is in between the compliant electrodes expands in lateral direction. As a consequence, the optical element 204 is laterally displaced by the distance d2. Due to the prestreching of the polymer film, the region that is not in between the actuated first and second electrode 205a-206a and/or connected to the optical elements shrinks in lateral direction. This prevents the device from out of plane buckling.

In a third state depicted in FIG. 2C, a voltage difference V is applied between the electrodes 205b and 206b via the conductors 209b and 210b, respectively. The polymer film 201 in between the electrodes 205b-206b is compressed. Due to the volume-incompressibility of the polymer film, the region of the polymer film which is in between the compliant electrodes 205b and 206b expands in lateral direction. As a consequence, the optical element 204 is laterally displaced by the distance d3. Due to the prestreching of the polymer film, the region that is not in between the actuated first and second electrode 205b-206b or connected to the optical elements shrinks in lateral direction. This prevents the device from out of plane buckling.

Figure 2D:
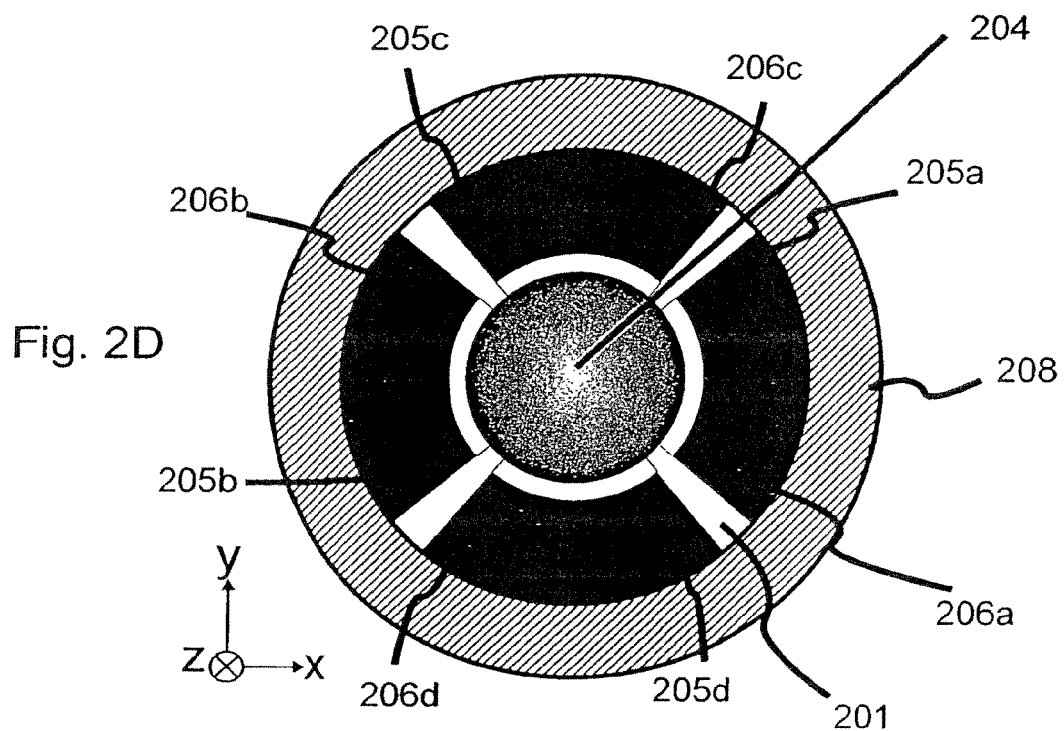
FIG. 2D depicts a third embodiment in top view.

FIG. 2D depicts in a top view, an alternative of the third embodiment according to the invention in a state without applied voltage difference. It differs from FIG. 2A, FIG. 2B, and FIG. 2C in that four pairs of first and second electrodes are located on the surfaces 202 and 203 on the polymer film. The voltage differences applied between the electrodes 205a-b and 206a-b control the lateral displacement of the rigid optical element 204 in x-direction. The voltage differences applied between the electrodes 205c-d and 206c-d control the lateral displacement of the rigid optical element 204 in y direction.

Figure 2E:
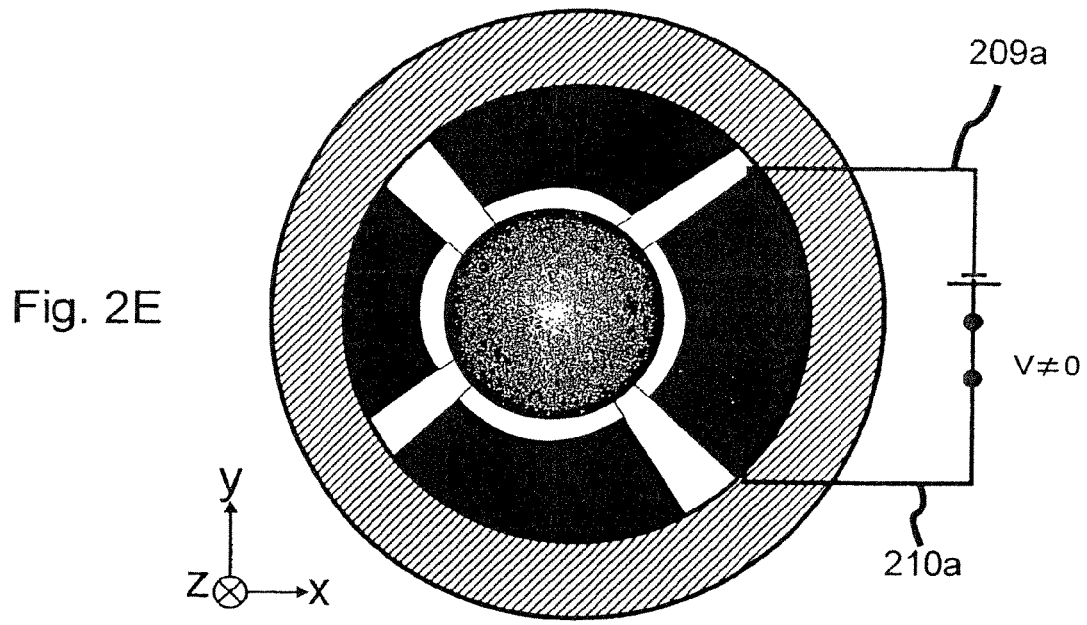
FIG. 2E depicts the third embodiment in a third state.

FIG. 2E depicts a second state of the third embodiment. A voltage difference V is applied between the electrodes 205a and 206a via the conductors 209a and 210a, respectively. The polymer film 201 in between the electrodes 205a-206a is compressed. Due to the volume-incompressibility of the polymer film, the region of the polymer film between the compliant electrodes expands in lateral direction. As a consequence, the optical element is laterally displaced in x-direction. Due to the prestreching of the polymer film, the region that is not in between the actuated first and second electrode 205a-206a and/or connected to the optical elements shrinks in lateral direction.

Figure 2F:
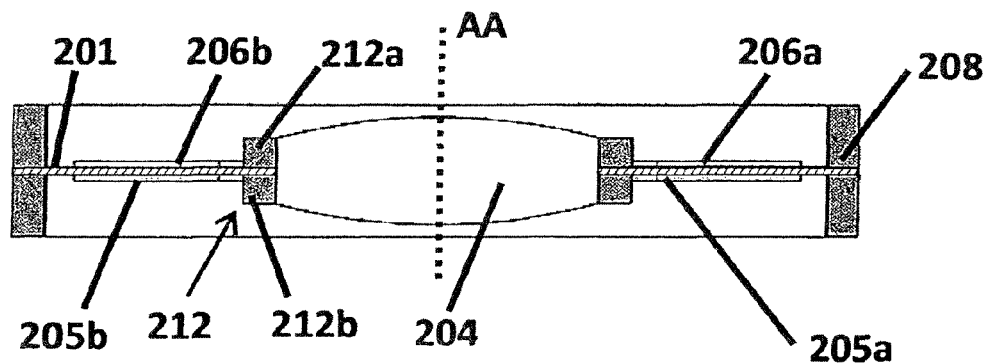
FIG. 2F depicts an alternative to the second embodiment in side view.
Figure 2G:
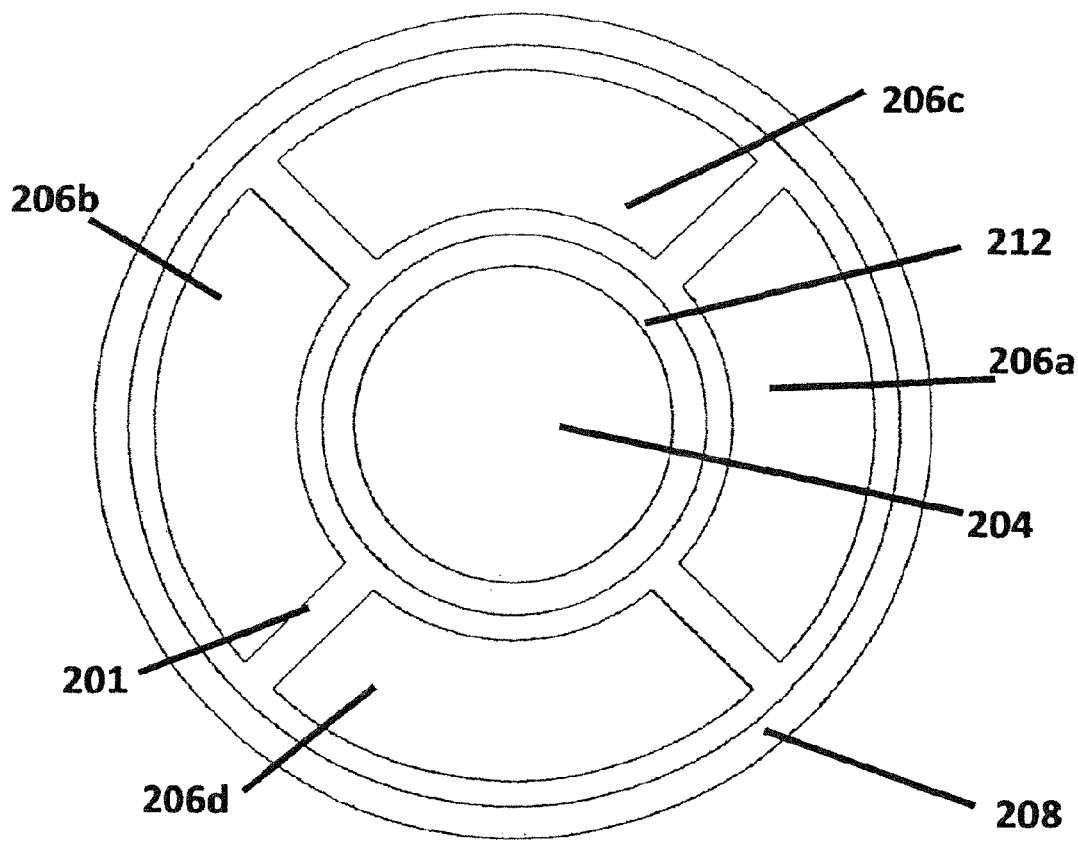
FIG. 2G depicts an alternative to the second embodiment in top view.

FIGS. 2F and 2G depict an alternative to the second embodiment of the invention. It differs from FIGS. 2D and 2E in that the rigid optical element 204, which is e.g. a lens or a scrambling element, is connected to the polymer film 201 via an intermediary element 212. Intermediary element 212 comprises a pair of rigid rings 212a, 212b connected to opposite sides of the polymer film 201. The intermediary element 212 may be connected to the polymer film 201 by an adhesive or by clamping. Rigid optical element 204 is mounted to intermediary element 212, e.g. by means of an adhesive or by being jammed into intermediary element 212. In the embodiment of FIGS. 2F and 2G, rigid optical element 204 is a lens, which can be displaced parallel to polymer film 201 by applying voltages to the electrodes 205a-205d and 206a-206d.

The electrodes 205a-205d and 206a-206d are again arranged in segments around rigid optical element 204. The voltage difference applied between the electrodes 205a and 206a control the lateral displacement of the rigid optical element 204 in x-direction. The voltage difference applied between the electrodes 205b and 206b control the lateral displacement of the rigid optical element 204 in y-direction.

To manufacture the device of FIGS. 2F and 2G, a polymer foil is first stretched within a frame, either within frame 208 or within another, larger frame. Then, the electrodes are applied, e.g. by means of printing techniques. Now, the two rigid rings 212a, 212b are affixed to the polymer film, thereby forming intermediary element 212. Optionally, frame 208 is mounted to the polymer film. Finally, optical element 204 is inserted into intermediary element 212.

Notes:

In general, and as shown in the figures, the device advantageously comprises a polymer film arranged in a flat plane with electrodes applied to the surfaces of the polymer film. A rigid, undeformable optical element is connected to the polymer film. The application of a voltage to the electrodes allows to displace the optical element in lateral direction, i.e. in a direction parallel to the flat plane of the polymer film.

Typically, and also as shown in the figures, the flat plane of the polymer film extends perpendicularly to the optical axis AA of the device, with the optical axis AA being the axis parallel to the light to be processed by the device. Thus, the application of a voltage to the electrodes causes the rigid optical element to be displaced perpendicularly to the light being processed.

Also, as shown, the electrodes are advantageously placed laterally outside the rigid optical element.

The deformation of the film polymer depends on the elastic modulus and dielectric constant of the material used, the shape of the material, as well as the boundary conditions.

The shape of the optical element as well as of the polymer film and the electrodes can be adapted to these various applications. In particular, the electrodes, the film as well as the optical element can be of any suitable shape and e.g. by triangular, rectangular, circular or polygonal. The first and second electrodes can also have annulus shape.

The invention is not limited to the shapes of the polymer film as described above. Indeed, other shapes could be defined for displacing the optical element in a directions not parallel to the x- or y-direction.

As mentioned, the rigid optical element 104, 204 can also be integrated into the polymer film, i.e. it can be partially or fully embedded into the polymer film, as illustrated, by way of example, by the optical element 104' shown in dotted lines in FIG. 1A.

Some Applications:

The optical device can be used in a large variety of applications, such as:

Projection devices, e.g. for applications in the optical part of projectors for macro- and micro-projectors in beamers and hand-held devices
Laser metrology systems
Displays
Image stabilization in cameras
Image stabilization in industrial systems
Industrial applications including laser cutting or welding
Microscopes
Vision systems, having any kind of camera
Light scrambling in research applications
Telecommunication applications (amplitude modulation)

Illumination control, including color control by positioning absorbing elements over the illumination element, directional light control for illumination, intensity control of LED illuminations.

While there are shown and described presently preferred embodiments of the invention, it is to be distinctly understood that the invention is not limited thereto but may be otherwise variously embodied and practiced within the scope of the following claims.

The invention claimed is:

1. An optical device for light scrambling comprising:
a polymer film arranged in a plane and comprising a first surface and a second surface, wherein the plane of said polymer film comprises first and second non-overlapping sections,
a first electrode located on said first surface and arranged in said first section,
a second electrode located on said second surface and arranged in said first section,
a rigid, undeformable optical element connected to said polymer film and arranged in said second section, wherein the application of a voltage difference between said first and said second electrodes displaces said optical element parallel to the plane of said polymer film,
wherein said optical element is suited to destroy visible speckling effects when being moved back and forth.

2. The optical device of claim 1 wherein said optical element is selected from the group consisting of an optical diffuser, a diffractive structure, a micro lens array, a diffraction grating, and a hologram.

3. The optical device of claim 1 wherein the rigid optical element is connected to the polymer film by means of an adhesive, self adhesion or a weld.

4. The optical device of claim 1 wherein said polymer film comprises a material selected from the group consisting of gels, thermoplasts, duroplasts, acrylic materials, and elastomers, or wherein said optical element is of polymer, plastic, glass or a crystalline material.

5. The optical device of claim 1 wherein the polymer film is freely suspended in a holding means.

6. The optical device of claim 5 wherein the polymer film is attached to the holding means in a prestretched manner.

7. The optical device of claim 1 wherein said electrodes are made from at least one material selected from the group consisting of carbon nanotubes, carbon black, conducting grease, metal ions, fluid metals, metallic powders, and conducting polymers.

8. The optical device of claim 1 further comprising an antireflective layer on at least one surface of said optical device.

9. The optical device of claim 8 wherein said antireflective layer comprises structures having a size smaller than 1 µm.

10. The optical device of claim 8 wherein said antireflective layer comprises structures having a size smaller than 200 nm.

11. The optical device of claim 1 wherein said first electrode and said second electrode are each arranged in segments around said optical element,
wherein a voltage difference applied between a first electrode segment of said first electrode and a corresponding first electrode segment of said second electrode controls the lateral displacement of the rigid optical element in a first direction parallel to the plane of said polymer film, and
wherein a voltage difference applied between a second electrode segment of said first electrode and a corresponding second electrode segment of said second electrode controls the lateral displacement of the rigid optical element in a second direction parallel to the plane of said polymer film.

12. A method for operating an optical device, wherein said optical device comprises a polymer film comprising first and second non-overlapping sections, lying in a plane, and having a first surface and a second surface, a first electrode located on said first surface and arranged in said first section, a second electrode located on said second surface and arranged in said first section, and a rigid, undeformable optical element suited to destroy visible speckling effects when being moved back and forth, said optical element being connected to said polymer film, and being arranged in said second section,
wherein said method comprises the step of applying a voltage difference between said first electrode and said second electrode, thereby displacing said rigid optical element substantially along a plane parallel to said polymer film.

13. The operating method of claim 12 wherein said optical element is displaced to perform a periodic back and forth motion parallel to said plane at a given frequency.

14. The operating method of claim 13 wherein said given frequency is a resonance frequency of said motion.

15. A use of an optical device for light scrambling, wherein said optical device comprises
a polymer film arranged in a plane and comprising a first surface and a second surface, wherein the plane of said polymer film comprises first and second non-overlapping sections,
a first electrode located on said first surface and arranged in said first section,
a second electrode located on said second surface and arranged in said first section,
a rigid, undeformable optical element connected to said polymer film and arranged in said second section, wherein the application of a voltage difference between said first and said second electrodes displaces said optical element parallel to the plane of said polymer film, and
wherein said optical element is suited to destroy visible speckling effects when being moved back and forth.

16. The use of claim 15 wherein said optical element is selected from the group consisting of an optical diffuser, a diffractive structure, a micro lens array, a diffraction grating, and a hologram.

17. The use of claim 15
wherein said first electrode and said second electrode are each arranged in segments around said optical element,
wherein a voltage difference applied between a first electrode segment of said first electrode and a corresponding first electrode segment of said second electrode controls the lateral displacement of the rigid optical element in a first direction parallel to the plane of said polymer film, and
wherein a voltage difference applied between a second electrode segment of said first electrode and a corresponding second electrode segment of said second electrode controls the lateral displacement of the rigid optical element in a second direction parallel to the plane of said polymer film.

* * * * *